United States Patent [19]

Murphy et al.

[11] 4,407,885

[45] Oct. 4, 1983

[54] COMPOSITE ARTICLE

[75] Inventors: Guy C. Murphy; Jackie D. Jones, both of Fairfield; Charles T. Salemme, Madeira, all of Ohio

[73] Assignee: General Electric Company, Cincinnati, Ohio

[21] Appl. No.: 229,047

[22] Filed: Jan. 28, 1981

[51] Int. Cl.³ ............................................. B32B 7/00
[52] U.S. Cl. ................................ 428/246; 428/251; 428/252; 428/257; 428/402; 428/408
[58] Field of Search ............. 428/246, 251, 252, 257, 428/258, 259, 408, 902, 247, 284

[56] References Cited

U.S. PATENT DOCUMENTS

| | | | |
|---|---|---|---|
| 2,477,407 | 7/1949 | Grant et al. | 428/259 |
| 2,543,101 | 2/1951 | Francis | 156/62.2 |
| 3,914,501 | 10/1975 | Miller et al. | 428/296 |
| 3,997,697 | 12/1976 | Brochur | 428/259 |
| 4,001,478 | 1/1977 | Wong | 428/257 |
| 4,023,801 | 5/1977 | Von Auken | 428/408 |
| 4,103,055 | 7/1978 | Lorg | 428/259 |
| 4,126,499 | 11/1978 | Payen | 156/148 |
| 4,131,502 | 12/1978 | Mitra | 156/179 |
| 4,144,115 | 3/1979 | Sundberg | 156/161 |
| 4,194,037 | 3/1980 | Stoller | 428/92 |

*Primary Examiner*—James J. Bell
*Attorney, Agent, or Firm*—Lee H. Sachs; Derek P. Lawrence

[57] ABSTRACT

A composite fabric preform and article made of both structural and thermoplastic fibrous materials and a method of making such preform and article, the method improving the handling properties of the composite. A plurality of layers of fabric made from structural fibrous material are disposed in a stacked assembly with layers sequentially adjacent each other. At least each of alternate layers of the alternate layers of fabric include within its weave thermoplastic fibrous material intermixed with the structural fibrous material. The layers of fabric, preferably under pressure, are heated at a temperature sufficient to promote bonding action by the thermoplastic fibers at junctures between fibrous materials.

2 Claims, 3 Drawing Figures

COMPOSITE ARTICLE

The invention herein described was made in the course of or under a contract, of a subcontract thereunder, with the U.S. Department of the Air Force.

BACKGROUND OF THE INVENTION

1. Field of the Invention

This invention relates to composite fabrics and to a method of making composite fabrics, and more particularly, to an improved method of adhering or bonding the layers of composite fabrics made of fibrous material to provide an improved composite preform.

2. Description of the Prior Art

Composite fabrics made from fibrous materials formed into both woven and non-woven material, are well-known in the art. Yarns of glass, carbon and graphite are typically woven into fabrics, and a plurality of layers of fabric are stacked and cut into dry fabric preforms. The preforms are then stitched and/or impregnated with a resin binder to form a rigid composite fabric.

Many composite fabrics made from fibrous materials, such as yarns, fibers, filaments and the like, have substantial rigidity and other properties which make them desirable for many applications. Certain of the composite fabrics even have sufficient rigidity and strength so that they can be formed into components heretofore made from metals. For example, many composite fabrics have sufficient strength, rigidity, impact resistance and other desirable properties which make them useful materials for turbomachinery blading members, for example fan blades for jet engines. However, in making composite fabric preforms of fibrous materials, it is difficult to hold mechanically the layers of substantially dry structural fabrics and to prevent damage to the yarns, fibers and/or filaments in the stacked assembly of such dry fabric layers during various operations such as cutting, stitching and the like.

Fiber impregnation with plastics materials is well-known in the prior art, and in U.S. Pat. No. 4,131,502, unidirectional fibers and auxiliary strips of non-fibrous or fibrous materials are impregnated with plastics materials. This is accomplished by placing sheets of plastic material upon release sheets, applying the unidirectional fibers and auxiliary fibrous or non-fibrous material to the surface of the sheet of plastics material, applying a second release sheet upon the surface of the unidirectional fibers and auxiliary fibrous and non-fibrous material. Thereafter heat and pressure are applied such that the plastic sheet material flows about the unidirectional fibers to form a series of coherent ribbons. This produces ribbons suitable for use in filament windings, and the plastics material serves as a reinforcing material to the ribbons and to the filament windings made therefrom. In U.S. Pat. No. 4,131,502, the plastics materials may comprise a single thermosettable resin, such as an epoxide resin and other conventional thermosettable resins.

Rigid, perforated cloth is prepared in the prior art by wrapping a core of yarn with a covering yarn made from a thermoplastic polymer to produce a completely wrapped yarn. The yarn then is woven into a perforated cloth in both the warp and weft directions. In U.S. Pat. No. 4,126,499, the foregoing cloth made from the wrapped yarn is heated to a temperature in excess of the melting temperature of the thermoplastic covering polymer, but below the deformation and melting temperatures of the core yarn, in order to melt the covering thermoplastic polymer. The heated cloth is then cooled to provide a rigid, perforated cloth in which the points of intersection of the wrapped yarn adhere to each other due to the prior melting of the thermoplastic covering polymer.

In U.S. Pat. No. 4,144,115, a tubular sheath is made by weaving inorganic fiber threads having a plurality of spaced axial threads which form crossing points with the threads of the braid or weave, the axial threads comprising a mixture of at least two thermoplastic fibers having different softening temperatures. The tensioned braid or weave is heated to a temperature sufficient to soften the thermoplastic fiber having the lower softening temperature to bond the latter to the inorganic fibers at their crossing points only, and weakening the thermoplastic fibers having the higher softening temperature to enable the latter to be only slightly elongated during tensioning. This is intended to substantially equalize stresses within the thermoplastic fibers having the higher softening temperature so that the latter are of the same length following release of the tensioning, cooling the sheath and releasing the tensioning.

Non-woven fabrics, having an upper and a lower surface and comprising dyeable, flame-resistant fibers and base fibers are disclosed in U.S. Pat. No. 4,194,037. There the fabric is formed by needling base fibers together to form a batt, needling polyvinyl chloride fibers and the batt together, and then heating the lower surface made of a blend of adhering base fibers and polyvinyl chloride fibers to adhere the polyvinyl chloride and base fibers together.

Although the various prior art references teach the melting of heat softenable materials distributed therein to promote adherence or a bonding action between various fibers, the prior art references are directed to the joining of individual strands to each other or to a backing sheet. However, as discussed above, when composite fabrics made of fibrous materials are placed in stacked layers or plies so that the layers are adjacent each other, for the purpose of forming dry fabric preforms, they are difficult to handle. It is difficult to carry out subsequent operations on such stacked assemblies of fabrics. For example, it is difficult to cut, to stitch and impregnate the stacked fabric assemblies with resins. Mere mechanical means for holding the dry structural composites of fibrous materials, for example, of glass and graphite, are inadequate because even though the layers of fabric can be mechanically secured by various mechanical means such as, clamping devices, pressure platens and vacuum manifolds, the fabrics become frayed during initial ply cutting operations and various other operations which damage the fibers. Furthermore, in many cases when resins are impregnated into the composite fabrics, and the mechanical holding means is removed therefrom for the purpose of stitching the composite fabrics in a transply or other direction, the needling operation severs and fragments yarns, threads, fibers and filaments which are securely held in the cured resin material.

SUMMARY OF THE INVENTION

Accordingly, it is the principal object of this invention to provide a composite fabric and a method of making a composite fabric which overcomes the foregoing disadvantages.

A further object of this invention is to provide a composite fabric and a method of making a composite fabric which improves the handling properties of dry fabric preforms or layers of fabric used for the formation of composite fabric materials.

It is another object of this invention to provide a composite fabric and a method of making a composite fabric which can be mechanically held in a dry structural form for cutting and other operations while reducing or substantially eliminating fraying and subsequent damage to the composite fabric and yarns, threads, filaments and/or fibers therein.

Still another object of this invention is to provide a composite fabric and a method of making a composite fabric which cements together, adheres or otherwise secures the layers of fabric in the composite so that the composite fabric can be easily handled for subsequent operations.

These and other objects of the invention are accomplished by incorporating thermoplastic fibrous material within the weave of at least alternating layers, and preferably each layer, of a composite fabric made of fibrous materials. As used herein, the phrase "within . . . weave" is intended to include within its meaning "within the structure of non-woven layers". A plurality of layers of such fabric are stacked adjacent each other to provide a preform assembly. Thereafter, the layers of fabric are compacted and the compacted layers are heated at a temperature sufficient to promote a bonding action by the thermoplastic fibrous material at junctures between the fibrous materials. Each layer of fabric or alternate layers of fabric must have thermoplastic fibrous material incorporated therein.

In accordance with the present invention, in an article of manufacture comprising a composite of a plurality of layers of fabric including structural fibrous material, disposed in a stacked assembly sequentially adjacent and in contact with each other, the improvement comprises including within the weave of at least alternating layers of such fabric a thermoplastic fibrous material intermixed with structural fibrous material therein. This is followed by compacting the layers of fabric and heating such compacted layers at a temperature sufficient to promote a bonding action by the thermoplastic fibrous material at junctures between the fibrous materials.

The thermoplastic fibrous material, which is incorporated into the composite fabric and which can be of one or more types, permits temporary or permanent adhesive-like tacking or securing of the structural fibrous material and avoids fraying and other damage when the fabric is cut, further processed and/or handled. It is believed that the thermoplastic fibrous material globulates at the nodal points between the warp and fill yarns when the melting point of the thermoplastic fibrous material is reached or surpassed while the layers of fabric are compacted and in close proximity, thereby effectively cementing the preform into a substantially dry, handleable composite for subsequent processing.

In accordance with the present invention, there also is provided a method of making a substantially dry composite fabric preform comprising: positioning a plurality of layers of fabric including structural fibrous material adjacent and in contact with each other, each layer of fabric or alternate layers of fabric including within its weave thermoplastic fibrous material intermixed with the structural fibrous material; and then heating the compacted layers at a temperature sufficient to promote a bonding action by the thermoplastic fibrous material at junctures between the fibrous materials. Pressure may be applied to the layers of fabric to form compacted layers of fabric. Thus, there is provided a method of improving the handling properties of a composite fabric preform having a plurality of layers of fabric. For example, by the method of this invention and with the composite fabric of this invention, cutting of the composite fabric can be easily carried out without external mechanical holding means and/or with minimal damage to, or fraying, splitting or severing of, the fibrous materials which make up the various layers, plies or individual fabric layers of the composite fabric.

The dry composite fabric preforms of the present invention can be cut, impregnated with a resin binder, stitched or needled, and the like, preferably after the heated, compacted layers have been cooled. The thermoplastic fibrous material aids in holding the dry structural yarns of fibrous material during the initial ply cutting operation, stitching or needling, and/or resin binder impregnation, and during subsequent handling and post treatment operations.

The thermoplastic fibrous material when subjected to a temperature substantially at or above the melting point of the thermoplastic fibrous material, cements together the various layers of fabric by the fusion of the thermoplastic fibrous material at junctures between the fibrous materials while the dry fabric layers are in a compacted state. In certain cases, the temperature may be less than the melting temperature of the thermoplastic fibrous material provided the thermoplastic material becomes tackified, softened or otherwise sufficiently adherent at an elevated temperature to bond, fuse, cement or secure the dry fabric layers together. This preform is easily handled through subsequent operations with minimal damage, if any, to the structural yarns, fibers, threads and/or filaments included in the fabric layers. For example, the three-dimensional preform or composite fabric can be stitched with high strength threads to introduce transply reinforcing fibers in the inherently weak direction of the laminated composite fabric. Also, the preform can be positioned into a die or mold and impregnated with resin by pressurized resin transfer molding methods followed by a subsequent curing of the resin matrix to produce the final composite fabric. In accordance with the present invention, the structural yarns, fibers, threads or filaments in the substantially dry composite preform may be only lightly cemented or bonded together by the fused thermoplastic fibrous material. Then, during such operations as stitching, penetration of the needle results in minimal fiber damage because the needle preferentially shears the bonding material reducing or avoiding damage to the fiber, thread, filament or yarn. It has been found that the composite fabrics made in accordance with the present invention have mechanical properties almost identical to the mechanical properties of more complex prior art pre-impregnated tapes employing ply or layer sequences of unidirectional fabrics, for example, a sequence of 0°, 35°, 0°, −35° (relative position of each subsequent unidirectional fabric to the foregoing layer of unidirectional fabric).

As used herein, fibrous material, fibers, threads, filaments, yarns and equivalent descriptors may be used interchangeably. Furthermore, as used herein, a plurality of layers adjacent each other means that at least two layers of fabric are stacked upon each other to form a stacked assembly of the substantially dry fabric layers.

A fabric is defined herein as woven or non-woven and includes batting, felts, cloth and the like.

The present invention also embraces various composite fabrics wherein the heated, compacted layers of fabric are cooled and form a rigid composite fabric. Furthermore, the invention also embraces those embodiments wherein the composite fabric is formed by simultaneously compacting and heating or simultaneously compacting, heating and cutting the layers or plies of fabric.

Further objects of this invention together with additional features and advantages thereof will become apparent from the following detailed description of the preferred embodiments of the invention when read in conjunction with the accompanying drawings.

DESCRIPTION OF THE PREFERRED EMBODIMENTS

Figure 1:
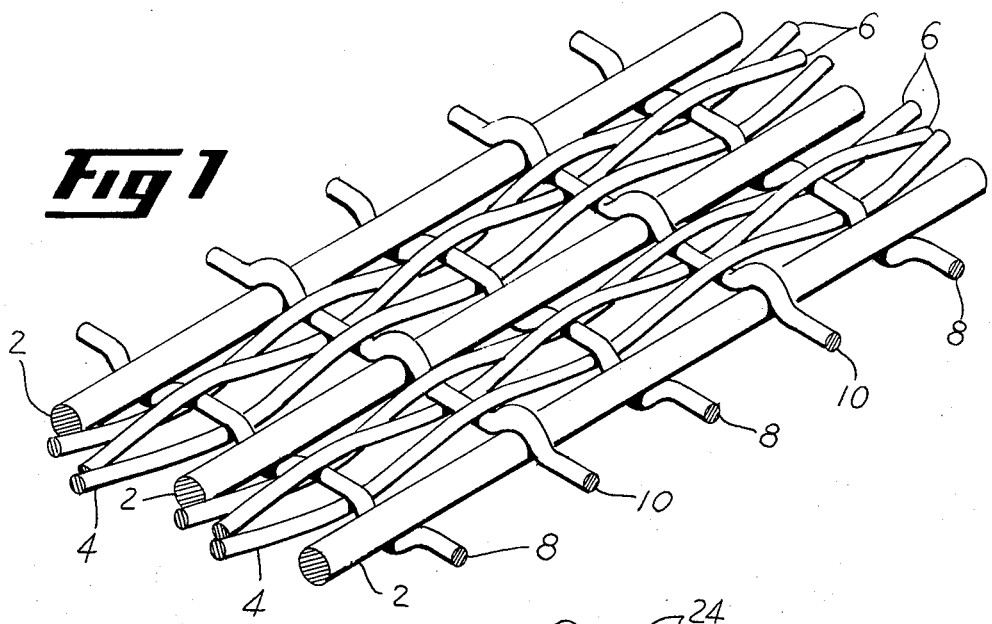
FIG. 1 is a fragmentary, perspective view of a single layer of woven fabric showing an exemplary distribution of yarns.

The article of manufacture of this invention is made, in one embodiment, by stacking a plurality of layers of fabric comprising fibrous material, at least alternating layers of the plurality of layers of fabric having thermoplastic fibrous material distributed in or intermixed within the weave of the structural fibrous material; preferably compacting the layers of fabric to form compacted layers of fabric; and heating the stacked layers at a temperature sufficient to promote a bonding action by the thermoplastic fibrous material at junctures between the fibrous materials. In most preferred embodiments, the heated, compacted layers are cooled after there has been a sufficient amount of heat to promote satisfactory bonding by the thermoplastic fibrous material.

Generally, the amount of heat sufficient to promote the satisfactory bonding by the thermoplastic fibrous material is that temperature required to melt the thermoplastic fibrous material, to soften or tackify the thermoplastic fibrous material, or to otherwise cause the thermoplastic fibrous material to adhere to, cement, fuse, bond or secure the layers of fabric, hereinafter referred to as bonding or a bond. The length of time heat is applied to the composite is not critical as long as the heat is applied for a sufficient time to penetrate the layers of fabric in order to bring about such bonding action between the layers of fabric. For example, the stacked or compacted layers of fabric may be heated from about one second up to about 15 minutes in certain preferred embodiments. The amount of heat required, that is, the temperature required, and the length of time required depend upon various factors including the number of layers of fabric in the composite fabric, the thickness of the layers, the type or types of thermoplastic fibrous material, the type or types of structural fibrous material, and the state at which the thermoplastic fibrous material secures or bonds the layers together. These parameters can be easily adjusted and optimized by one skilled in the art without undue experimentation.

In preferred embodiments, the temperature is at least the melting point of the thermoplastic fibrous material but less than the temperature required to degrade, decompose, or otherwise compromise the structural integrity of the fabric and/or its structural fibrous components. Although the temperature depends upon the particular type or types of thermoplastic fibrous material or combinations thereof, the preferred temperatures are generally greater than about 260° C. (500° F.) to below the decomposition temperature of the thermoplastic fibrous material or the structural fibrous material, whichever of such material decomposes at the lower temperature. For example, the polyester thermoplastic fibrous material made from polyethylene terephthalate and identified by E. I. duPont de Nemours and Company under the trademark, Dacron, melts at about 250° C. and decomposes at about 350° C. In preferred embodiments, the temperature at which such compacted or compressed layers of fabrics are heated is about 250° C. to about 275° C.

The layers of fabric useful in the subject invention may have any desirable shape, size, form and configuration, and include woven and non-woven fibers, yarns, threads, filaments and the like. The non-woven fibers or materials may be batts, felts, pads, and the like. The structural fibrous materials may be any well-known materials which form fibers, filaments, threads, yarns, woven fabrics, non-woven fabrics, batts, felts, and the like. As used herein, the term, structural fibrous material, embraces all of the various types of materials which form such fabrics useful in a plurality of layers to form a composite fabric in accordance with the present invention. Exemplary structural fibrous materials include glass in the form of glass fibers, carbon or graphite in the form of carbon or graphite fibers, non-graphite carbon fibers, vitreous carbon fibers, boron monolithic graphite and monolithic non-graphite carbon fibers, silicon and other refractory materials. A particularly useful structural fabric is one made of a combination of glass fibers and graphite fibers wherein the glass and the graphite fibers are woven into a fabric from yarns made thereof. In an example of the woven fabric made therefrom, carbon filaments and glass filaments or yarns are woven in the warp direction along with yarns made of a suitable thermoplastic material, for example, a polyacrylic yarn. Glass fibers and carbon fibers or yarns are used in the weft or fill direction.

When a plurality of types of thermoplastic fibrous materials are used, they may be incorporated in a single yarn or thread. Alternatively, yarns or threads made of a single type of thermoplastic fibrous material may be used with yarns or threads of another single type of thermoplastic fibrous material to form the woven or non-woven fabric.

The size of the thermoplastic yarns, filaments, threads and fibers may be those which are conventionally used in making woven or non-woven fabrics. Although it is not critical in the practice of the present invention, for woven fabrics, yarn sizes are preferably about 1,000 filament tows up to about 24,000 filament tows.

The thermoplastic fibrous material which may be used to bond the layers of fabric in the composite fabric of the present invention together may be selected from a variety of well-known heat softenable, thermoplastic fibrous material including polyamides, polyacrylics, polyesters, and polyolefins, derivatives of the foregoing, and mixtures thereof. Examples of derivatives of the foregoing include halogenated species or species which have various functional groups attached thereto.

Polyolefins include polyethylene, polypropylene, polybutylene and the like. For example, polyethylene which softens at about 110° C. or polypropylene fibers which soften at about 150° C. may be incorporated with the structural fibrous materials to form the fabrics used in the present invention. The polyethylene fibers become softened sufficiently to become bonded to the structural fibrous materials, and/or to other polyethylene fibers in consecutive or adjacent layers of fabric. Other thermoplastic fibers which may be used in accordance with the present invention include polyvinyl chloride fibers which soften at a temperature in the range of about 60° to 71° C., polyethylene terephthalate fibers having a melting point in the range of 258° to 263° C., and such polyacrylic fibers as Orlon fiber or Acrilan fiber which have a melting point of approximately 220° C. Polyester fibers, such as polyethylene terephthalate, having a melting point of about 250° C. and sold under the trademark, Dacron, is one of the preferred materials useful as a thermoplastic fiber for the composite fabrics of the present invention. Dacron and Orlon are trademarks of E. I. duPont deNemours & Co., and Acrilan is a trademark for a synthetic acrylic fiber made by Monsanto Company. Examples of other thermoplastic polymers which may be used as thermoplastic fibrous materials in accordance with the present invention, include Nylon-6, Nylon-11, and Nylon-66 materials. The term Nylon refers to a family of polyamide polymers characterized by the presence of the amide group. Polyesters include yarn materials made from a linear polyester comprising at least 85% (by weight) in the chain of an ester of a dihydric alcohol and terephthalic acid. In accordance with the present invention, the only requirement of the thermoplastic fibrous material is its ability to promote the bonding action of the layers of fabric in the composite fabric at a temperature less than the melting point, decomposition temperature, destructive temperature or degradation temperature of the structural fibrous material used in the fabric layers and/or the decomposition temperature, destructive temperature or degradation temperature of the thermoplastic material itself. Thus, one skilled in the art can choose from a wide variety of thermoplastic fibrous material to promote the bonding action required to bond the layers of fabric together. The amount of thermoplastic fibrous material incorporated in the layer or layers of the composite fabric is not critical in the practice of the present invention as long as there is a sufficient amount of thermoplastic fibrous material to promote a bonding action to secure the layers of fabric in the composite together at junctures between fibrous materials. Furthermore, the amount of thermoplastic fibrous material in the layers of fabric may vary from layer to layer, and one skilled in the art can easily determine optimum amounts of thermoplastic fibrous materials per layer of fabric based upon the intended use for the composite fabric. In a composite fabric, certain layers may contain little or no thermoplastic fibrous material whereas an adjacent layer may comprise substantial amounts, for example, up to 60% (by volume) or higher of thermoplastic fibrous material (based upon the total volume of the structural fibrous material and thermoplastic material in the layer of fabric). In preferred embodiments, the amount of thermoplastic fibrous material in a layer or ply of the composite fabric is generally from a small but effective amount sufficient to provide bonding action, for example about 2.0 volume percent up to about 25 volume percent based upon the total volume. Generally, the most preferred embodiments of the present invention have about 4 volume percent to about 8 volume percent thermoplastic fibrous material a layer or ply of the composite fabric. For most uses, the minimum amount of thermoplastic fibrous material required to bond the layers of fabric together, is preferred to maintain the structural integrity of the overall composite fabric. Thus, even though certain layers of fabric may have amounts of thermoplastic fibrous material included within the weave, adjacent layers of fabric in the composite may have little or no thermoplastic fibrous material therein. This results in an overall composite fabric having only a minimal amount of thermoplastic fibrous material therein, yet an amount sufficient to provide bonding action between layes of fabric in the composite.

The bonding of the fabric layers together as described above, may be permanent or temporary depending upon the particular thermoplastic fibrous material used in the composite fabric and depending upon its interaction or bonding capability with the particular structural fibrous material used in the fabrics of the composite layers. For example, when Dacron fiber is used as the thermoplastic fibrous material in a fabric woven from glass fibers, graphite yarn and Dacron fibers, the fusion or melting of such thermoplastic fibrous material results in a substantially temporary bond of the layers in the composite fabric. When such a composite fabric is strengthened by transply stitching in the unimpregnated state, the bond formed between the Dacron fiber and the other fibrous materials can be easily, and is preferentially, ruptured, thereby preventing damage to the graphite and glass fibers when the needle passes through the layers in the composite fabric. Any subsequent heating of the composite fabric will again bond any layers loosened or separated by handling, stitching, cutting and the like.

The heat required to promote the bonding action by the thermoplastic fibrous material may be applied in any suitable manner. Heat may be applied with heated rolls, heated pressure rolls, heated molds, radiated heat such as heat provided from an infra-red lamp, press platens, and the like. The manner in which the heat is applied to promote the bonding action by the thermoplastic fibrous material is not critical in the practice of the present invention. As discussed above, the layers of fabric must be heated by a suitable heating means at a temperature sufficient to promote the bonding action by the thermoplastic fibrous material incorporated in the composite layers. The temperature can be easily determined by determining the melting point, softening point or tackifying point of the particular thermoplastic fibrous material used in the fabric. As was mentioned above, when the thermoplastic fibrous material is Dacron, a temperature of about 250° C. is required to melt the Dacron fibers to secure the layers of structural fabric together. Other exemplary melting points also have been described above. In preferred embodiments, the thermoplastic fibrous material is melted at least once to promote the bonding action of the fibrous material.

In accordance with the present invention, at least two layers of fabric must be placed adjacent each other to form a composite or laminated fabric. At least alternate layers and frequently each layer includes thermoplastic fibrous material within the weave. Although at least alternate layers of the plurality of stacked layers must have thermoplastic fibrous material incorporated within its weave, in the preferred embodiments of the present invention, each layer or ply of fabric in the composite fabric comprises at least one type of thermoplastic fibrous material. One skilled in the art can easily determine a suitable sequence of layers, primarily depending upon the properties required of the finished composite fabric. The number of layers in the composite fabric formed by the method of the present invention is not critical and is determined by the desired use for the composite fabric. For example, such composite fabric may have only two layers of fabric or can contain sufficient layers or plies of fabric to result in a composite fabric having a thickness of 5–7 cm or more.

After the layers or plies of fabric have been placed adjacent each other, that is, after the layers have been stacked, the layers of fabric are bonded by heating the thermoplastic material. Preferably they also are compacted by pressure or other suitable means to form compacted layers of fabric. Pressure, when applied, is intended to prevent the layers of the fabric from puffing up or to prevent separation of the layers of the laminate. Pressure is preferred and may be applied by any suitable means including positive pressure, for example, by means of pressure rollers, platens, clamps, and other compression devices, or by negative pressure, that is, by means of a vacuum holding device which compresses layers of fabric by suction or vacuum bag to form compacted layers. Many means of compacting the layers of fabric are available and are known to one skilled in the art. It is not critical in accordance with a preferred form of the method of the present invention that any particular amount of pressure be applied to compact the layers of fabric as long as they are securely held together. In some instances, little or no pressure is required. The application of pressure and heating may be carried out separately or simultaneously, for example, by using heated pressure rolls or heated pressure plates. The pressure can be released after the bonding action of the thermoplastic fibrous material is complete and preferably after cooling the thermoplastic fibrous material or after carrying out subsequent operations such as ply cutting operations, resin impregnation and the like. When pressure is released, the compacted composite fabric remains substantially in its compacted state if the temperature of the composite fabric has been reduced to a point where the thermoplastic fibrous material has hardened or solidified or otherwise formed a rigid bond with other material in the fabric. In certain preferred embodiments, the composite fabric may be formed by placing the layers of fabric adjacent each other in a suitable mold and applying the pressure and heat while the layers of fabric are held within the mold. In other embodiments, the composite fabric may be simultaneously compacted, heated, and cut.

In certain embodiments, the composite fabric may be cooled as desired, preferably cooling to ambient temperature after the compacted layers have been heated to promote or complete the bonding action by the thermoplastic fibrous material. The cooling can be accomplished by any conventional cooling means including forced air, circulating fluids, permitting the fabric to gradually cool to room temperature, and the like. Cooling is carried out to reduce the temperature of the compacted composite fabric below the melting point, softening point or tackifying point of the thermoplastic fibrous material.

In one embodiment of the present invention, the pressure and heat can be applied with a suitable cutting device. For example, a plurality of layers of the fabric are stacked sequentially adjacent each other, and a suitable pressure cutting device having heated cutting surfaces is applied to the layers of fabric. As the cutting edges of the cutting device engage layers of fabric, pressure is applied to the layers of fabric to form compacted layers of fabric and the compacted layers are heated. The bonding action of the thermoplastic fibrous material is promoted in that region in the layers of fabric where the heated cutting edges engage the layers of fabric.

The rigidity of the composite fabric is not critical and depends upon several variables. One skilled in the art can optimize and/or adjust rigidity as desired by controlling various parameters, for example, thickness of each ply, thickness of composite, number of plies, type, size and amount of structural, reinforcing fibrous material, type and amount of thermoplastic fibrous material, and optional parameters such as resin impregnation, curing of the resin, stitching and the like.

The rigidized preform prepared in accordance with the method of the present invention, can be easily handled through subsequent operations without damage to the structural yarns. The three-dimensional, substantially dry composite preform of fabric layers bonded to each other can be stitched with high strength threads to introduce transply reinforcing fibers in the inherently weak direction of the laminated composite fabric. Conventional stitching means and techniques may be used. It is generally preferred to strengthen the composite preform in the Z-direction axis (the X-Y axis being the warp and fill directions respectively). The Z-direction is substantially perpendicular to the plane of the fabric and generally defines the transply direction. Various available conventional yarns, threads or fibers may be used in the stitching. One preferred yarn for transply stitching is a synthetic organic polymer fiber sold as Aramid fiber E. I. duPont de Nemours and Co. under the name Kevlar. The dry composite preform, having the layers of fabric bonded to each other, can be impregnated with a resin by conventional well-known pressurized resin transfer molding methods, followed by a subsequent curing to produce a reinforced molded composite. Conventional, commercially available resins may be used for the resin impregnation of the fabric, and the preferred techniques embrace the injection of the resin into the composite fabric while the fabric is in a mold.

Referring to FIG. 1, there is shown a fragmentary perspective view of an exemplary layer of fabric made from two structural, reinforcing fibrous materials and one thermoplastic fibrous material. The magnified representation of a segment of a layer of fabric which may be used to make the composite fabric preform by the method of the present invention is a woven fabric, comprising structural yarn 2, for example, yarn made from carbon filaments as the primary yarn; hybridizing yarn 4, for example, fiberglass as the secondary yarn; and thermoplastic yarn 6, for example, yarn made from Dacron fibers, in the warp direction. Hybridizing yarn 8, for example, fiberglass; and structural yarn 10, for example, yarn made from carbon filaments, are shown in the fill or weft direction. In accordance with the method of the present invention to make a composite fabric preform, a plurality of the layers of fabric as illustrated in FIG. 1 are stacked adjacent each other.

Then pressure preferably is applied to the layers of fabric to form compacted layers of fabric and the compacted layers, or a portion thereof, are heated at a temperature sufficient to promote a bonding action by the thermoplastic fibrous material 6 between the layers of fabric. Upon reducing the temperature below the bonding temperature, a temporary or permanent bond is formed between layers of the fabric, and the layers of fabric remain compacted when the pressure is released. In accordance with the present invention, heat may be applied to the entire layer of fabric or to selected portions of the layer of fabric. For example, in certain cases it may be desirable to apply heat in those areas of the layer where cutting operations are carried out to secure the layers only where the cutting edges engage the fabric, thereby preventing shifting or movement of the layers and/or reducing fraying of the yarns, fibers or filaments at the cut edge.

Figure 2:
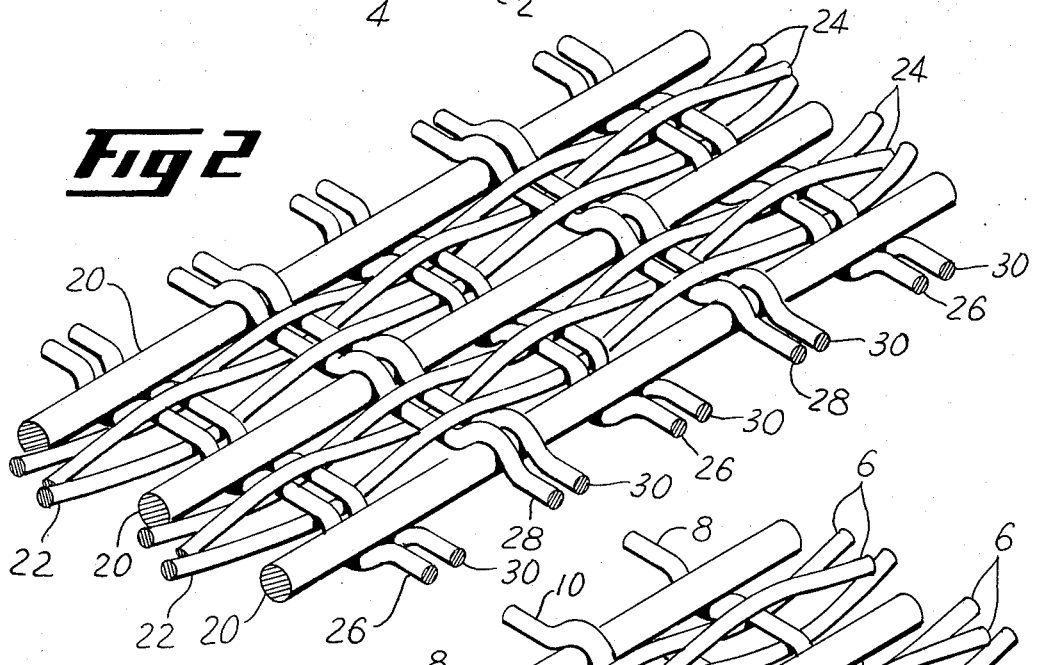
FIG. 2 is a fragmentary, perspective view of a single layer of woven fabric showing an exemplary alternative distribution of yarns.

In another exemplary embodiment as illustrated in FIG. 2, also showing a magnified, fragmented, perspective view of a layer of fabric which may be used in the method of the present invention, thermoplastic fibrous material 24 and 30 is used in both the warp and weft directions in the woven fabric. In FIG. 2, structural yarn 20, for example, carbon filament; hybridizing yarn 22, for example, fiberglass; and thermoplastic yarn 24, for example, Dacron; are used in the warp direction. Also, hybridizing yarn 26, for example, fiberglass; structural yarn 28, for example, carbon filament; and thermoplastic yarn 30, for example, Dacron, are used in the fill or weft directions. Thermoplastic yarns 24 and 30, when used in both the warp and weft directions, provide additional fibers of thermoplastic fibrous material (as compared with the embodiment of FIG. 1) to promote additional or more secure bonding action by the thermoplastic fibrous material.

Figure 3:
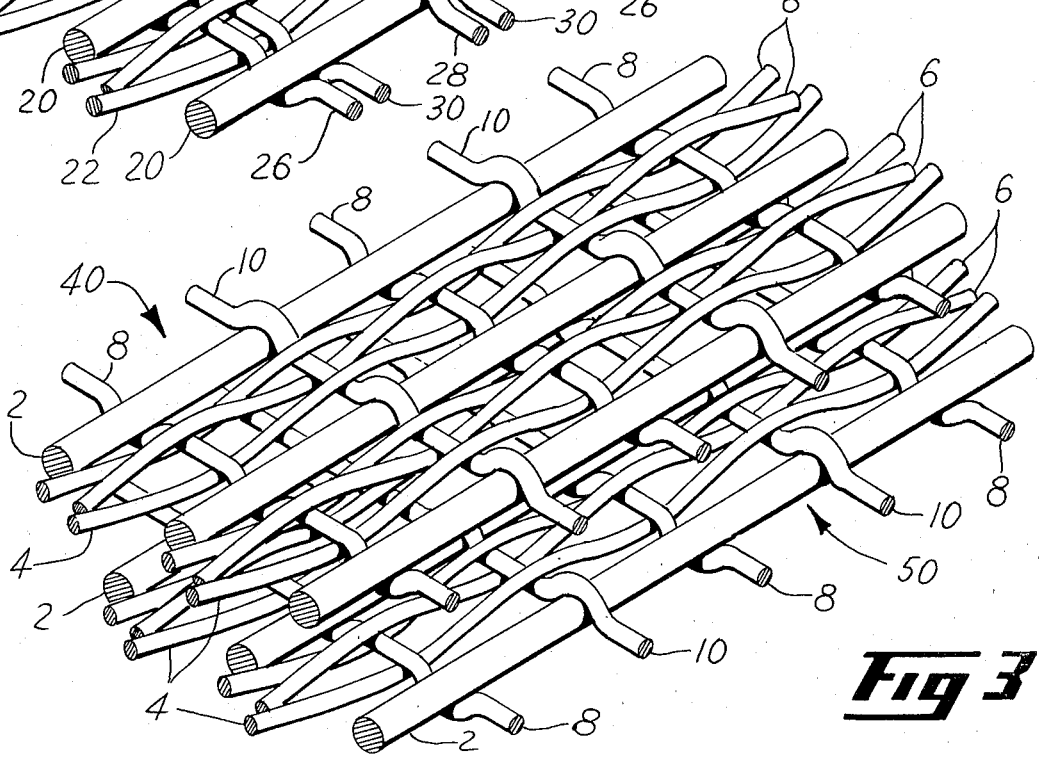
FIG. 3 is a fragmentary, perspective view of a plurality of layers of woven fabric in a stacked assembly at a stage prior to heating.

Referring to FIG. 3, two layers or plies 40 and 50 representing a plurality of layers of the fabric of FIG. 1, are placed sequentially adjacent each other to form a stacked assembly of fabric. The illustration in FIG. 3 is shown in the magnified, fragmented, perspective view to exemplify layering of the fabrics or plies prior to bonding by thermoplastic fibrous material 6 in each layer represented by layers 40 and 50. As shown in FIG. 3, the two layers are identical. However, the present invention contemplates use of any particular layer configuration, or mixture of configurations, such as woven and/or non-woven; alternate layering of plies containing thermoplastic fibrous material, and plies without thermoplastic fibrous material; and the use of different fabric materials in the composite fabric. As explained above and in accordance with a preferred embodiment of the present invention, when the plurality of layers, represented by layers 40 and 50 are compressed or compacted by conventional means, and the fabric is heated or exposed to heat at a temperature sufficient to promote the bonding action by thermoplastic fibrous material 6, layers 40 and 50 become bonded together.

Stitching may be carried out before the compacting and bonding or fusing of the layers. However, in accordance with the present invention, the preferred embodiments embrace the stitching to form transply reinforcement with threads or fibers, after the fusing of the thermoplastic fibrous materials into a substantially dry composite preform. Furthermore, in preferred embodiments, the composite fabric formed by the method of the present invention, may be cooled, stitched in any direction including the transply direction, resin impregnated, cut and the like or any combination of the foregoing in any sequence, as desired. For example, in one preferred embodiment for making a turbomachinery blading member such as a fan blade for a jet engine, from rigid composite fabric preforms made by the method of the present invention, the heated, compacted preform having melted thermoplastic fibrous material therein, is cooled below the melting point of the thermoplastic fibrous material most preferably to ambient temperature, to solidify the thermoplastic material. The pressure upon the cooled compacted composite fabric is then released, and the composite is then stitched in the transply direction with reinforcing yarn. After stitching is complete, the stitched preform is impregnated with resin by pressure injection and heated to cure the resin. The preform is then cooled and may be used as the final product. In another preferred embodiment, the heated compacted composite fabric having melted thermoplastic fibrous material therein is stitched in the transply or other suitable direction or directions prior to cooling of the composite fabric and/or prior to the release of pressure. The stitched composite fabric is then cooled, followed by the release of pressure and cutting. The stitched, cut composite fabric may then be optionally resin-impregnated. Thus, the general types of structures employing the present invention include the dry composite fabric preform having no resin impregnation and no stitching, the composite fabric preform having reinforcing stitching in the Z-direction; a composite structure of the preform having resin impregnated therein; and a composite fabric structure of the preform having both reinforcing stitching and resin impregnation. Naturally, other variations and optional steps are within the purview of one skilled in the art, and such variations and steps can be easily implemented once the basic method steps and composite preform of this invention are known.

As explained above, any combination of layers or plies, structural fibrous materials and thermoplastic fibrous materials in at least alternating sequentially arranged plies or layers may be used in accordance with the present invention in making the composite fabric preform. Furthermore, any fabric weight, knit or weave design, texture, fiber distribution, and the like as conventionally used for composite fabrics and preforms may be used in accordance with the method of the present invention. Plain, crimpless, semi-crimpless and other suitable weave patterns may be used in such woven fabrics. However, in preferred embodiments, the semi-crimpless weave offers an added degree of handleability resulting from the addition of thermoplastic fibrous material, for example, Dacron yarns in the warp direction, woven in pairs forming a locked leno stitch in the warp direction of the fabric. Subsequent heating of this fabric in the formation of a composite fabric preform, in accordance with the present invention, further locks the structural fibrous material due to the thermoplastic fibrous yarns fusing together at the joints or junctures where the thermoplastic fibrous yarns intersect with or contact other yarns, fibers, filaments or threads.

It has been found in accordance with the present invention, that when Dacron material is used as the thermoplastic fibrous material in a composite fabric preform, and the fabric is formed by heating the composite fabric or layers or plies of fabric to the melting point of the Dacron material, subsequent penetration of the needle during stitching of the cooled composite preform, and prior to impregnation, results in minimal fiber damage, as previously described. Furthermore, there is little or no fraying of the filaments and yarns of the composite fabric made by the method of the present invention due to cutting and other operations performed upon the composite fabric preform once the thermoplastic fibrous materials are bonded.

It is also within the purview of one skilled in the art to provide various surface treatments, finishes, primers, and other additives and adjuvants to improve the bonding, shear, texture and the like of the composite fabrics of the present invention. The thickness of each ply or layer can vary as desired. Generally, in preferred embodiments, the thickness of each ply or layer varies from about 2.0 mils to about 25 mils; however, this is not a limiting feature of the present invention.

Composite fabrics and uses for composite fabrics, stitched or unstitched, resin impregnated or without resin impregnation and the like, are well-known in the art and have many uses. One particular use for the method and preform of the present invention, impregnated with resin binder, is the manufacture of blading members, such as fan blades for jet engines. Such resin-impregnated composites have excellent durability, impact resistance and rigidity for such applications. The fusing or bonding of the layers or plies of fabric together by the thermoplastic fibrous material to provide the preform substantially improves the handleability of the preform: it can be easily cut with minimal damage to the preform and to its individual components, such as fibers, yarns and filaments.

The ply cutting may be carried out at any stage of the method of the present invention, but it is preferably carried out after the bonding or fusion of the layers. Any conventional ply cutting technique may be used. Exemplary ply cutting techniques include the clicker press technique (dies having sharp cutting edges), reciprocating knives and laser beam cutting.

The layers of fabric in the preform of the present invention can be unidirectional, that is, the fibers are oriented so that they are substantially aligned in a single direction, or they can be multi-directional, wherein the fibers are arranged perpendicular to each other or at any desired angle or sequence to each other. The individual plies can be arranged so that the warps of each layer are arranged in the same direction or perpendicular to the preceding layer or at any other desirable angle or sequence.

The following specific examples describe the article and the method of making the article of this invention. They are intended for illustrative purposes only and should not be construed as limiting the present invention.

EXAMPLE 1

A hybrid fabric was made by weaving a structural yarn identified as Thornel 300, a carbon filament yarn manufactured by Union Carbide Corporation; a structural hybridizing yarn, a fiberglass yarn identified as S-glass and supplied by Pittsburgh Plate Glass Industries; and Dacron thermoplastic polyester fibrous material in the warp direction. The Thornel 300 structural yarn and the S-glass yarn were used in the fill or weft direction. The weave design was a unidirectional/semi-crimpless design. In the warp direction, the structural filament was 10 ends of the Thornel 300 material 6,000 filament tows carbon yarn; the S2-glass was 10 ends of fiberglass having a 150/10 weight per unit length; and the Dacron thermoplastic fibrous material was 2-ply (70 denier) with 20 ends. The fill was 6.75 picks of the Thornel 300 material, 1,000 filament tows and a 2.25 picks fiberglass having a 150/10 weight per unit length S2-glass. The fabric weight was 0.47 oz/ft.$^2$, and the molded thickness was 0.009 inch (0.023 cm). The fiber distribution in the fabric was 5.70% by weight (7.4% by volume) Dacron material, 15.93% by weight (11.5% by volume) S-glass, and 78.37% by weight (81.1% by volume) carbon filament.

Layers of the woven fabric were stacked in a unidirectional pattern, and the number of layers of fabric or number of plies of fabric were such that the finished compacted product was about 6.3 cm in thickness. The layers of fabric were stacked in a mold, compacted by pressure means and heated to the melting point of the Dacron material, 250° C. After the Dacron material had melted, the composite fabric preform was cooled to room temperature. A sample of the preform could be stitched, and little fiber damage was noticed in areas punctured by the needle. A catalyzed epoxy resin blend, namely 50% by weight Araldite 6005 material and 50% by weight EPN 1138 resin, supplied by Ciba-Geigy Corp., was injected into the mold under pressure. The resin was cured by heating and the resin impregnated article was cooled and removed from the mold. Stimulated jet engine fan blades were made. The mechanical properties of the composite were almost identical to the mechanical properties of a pre-impregnated prior art tape employing a typical blade ply lay-up sequence of 0°, 35°, 0°, −35°, as shown in Example 2.

EXAMPLE 2

Composite articles were made by the method and fabric of Example 1 from a series of test panels 11.5 inches (29.2 cm)×11.5 inches (29.2 cm)×0.08 inch (0.20 cm) using the bidirectional form of woven fabric. Two lay-up patterns were evaluated, namely, [0°, 35°, 0°, −35°]$_S$ and [0°]$_8$. In the 0°, 35°, 0°, −35° orientation, the structural yarns of the fabric layers are consecutively arranged at the designated angles (relative to each other), and subscript S designates a balanced mirror image lay-up of the specified orientation or a total of 8 plies or layers. In the [0°]$_8$ orientation all structural yarns are aligned in the same direction, and the subscript, 8, designates 8 plies or layers. The preforms were resin injected with the epoxy resin blend described in Example 1. The mechanical properties in the warp direction and in the fill direction are shown in Table I below. In Table I, the tensile strength is shown in Ksi (thousands of pounds per square inch); Young's modulus, designated as Mod., is shown, in Msi (millions of pounds per square inch); flexural strength is shown in Ksi; and short beam shear is shown in Ksi, in both the warp direction and the fill direction. All tests shown are at room temperature. The tests compare two test panels having heat sealed Dacron yarn therein (Panels 1 and 2) with a third panel (Panel 3) made by a prior art technique, the third panel having a [0°, 35°, 0°, −35°]$_S$ balanced orientation of 8 plies in the form of a unidirectional tape (flat sheet fibers) made from treated carbon fibers and S-glass fibers.

TABLE I

MECHANICAL PROPERTIES OF RESIN INJECTED COMPOSITE PREFORMS HAVING THERMOPLASTIC FIBROUS MATERIAL INCORPORATED THEREIN
(All measurements at room temperature)

| | WARP DIRECTION | | | | | FILL DIRECTION | | | | |
|---|---|---|---|---|---|---|---|---|---|---|
| Panel | Tensile Str. (Ksi) | Mod. (Msi) | Flex. Str. (Ksi) | Mod. (Msi) | Short Beam Shear (Ksi) | Tensile Str. (Ksi) | Mod. (Msi) | Flex. Str. (Ksi) | Mod. (Msi) | Short Beam Shear (Ksi) |
| 1. [0°, 35°, 0°, −35°]$_S$ Contains melted Dacron material | 75.3 | 7.7 | 132.5 | 9.5 | 8.3 | 20.9 | 2.9 | 32.1 | 2.1 | 3.9 |
| 2. [0°]$_8$ Contains melted Dacron material | 103.4 | 11.6 | 174.1 | 11.9 | 9.3 | 13.6 | 2.5 | 27.9 | 2.2 | 3.4 |
| 3. [0°, 35°, 0°, −35°]$_S$ No Dacron material | 108.4 | 11.7 | 165.0 | 11.81 | 12.4 | 12.3 | 1.93 | 26.9 | 2.56 | 7.1 |

Referring to Table I, it can be concluded that the panels of the present invention (Panel #1 and #2) have substantially equal mechanical properties when compared with the panels of the prior art where the fabric contains no Dacron material. Thus, the thermoplastic fibrous material which improved the handleability of the composite does not compromise the mechanical strength of the composite fabric, and it can also be concluded that there is no loss in mechanical strength even when the structural yarns of the fabric are all aligned in the same direction (Panel #2).

EXAMPLE 3

Two different resin injected preforms were made by the method of Example 1. One sample containing the Dacron yarn was heated at a temperature above 250° C. to melt the Dacron yarn and the other sample containing Dacron yarn was not heated. Both samples had nine plies each, and the lay up pattern or structural yarn orientation was 0°. The room temperature mechanical properties of the two resin-transfer molded composite articles (no stitching) are compared in Table II below:

TABLE II

EFFECT OF HEATING THERMOPLASTIC FIBROUS MATERIAL IN COMPOSITE ARTICLES HAVING THERMOPLASTIC FIBROUS MATERIAL WOVEN THEREIN

| | Warp Direction | | | | |
|---|---|---|---|---|---|
| Panel | Tensile Str. (Ksi) | Mod. (Msi) | Flex. Str. (Ksi) | Mod. (Msi) | Short Beam Shear (Ksi) |
| 1. Not Heated | 132 | 12.87 | 169 | 12.01 | 10.7 |
| 2. Heated | 133 | 13.53 | 167 | 11.65 | 9.6 |

The data of Table II shows that there is no degradation in flexural tensile strength and modulii in the warp direction when the thermoplastic fibrous materials (Dacron yarn) are melted in a woven 9-ply composite preform impregnated with resin. Thus, the improved handleability, reduced fraying during cutting and other advantages of the composite preform made by the method of the present invention do not compromise the strength of the multi-layered composites.

In certain instances, data has indicated a potential reduction in the warp direction flexural properties probably created by the initial shrinkage of the Dacron thermoplastic yarn prior to melting and the resultant distortion of the warp structural yarns. However, in those cases the short beam shear and transverse properties were basically unaffected. This can be overcome by additional pressure or compaction loading on the preform to restrain warp fibers from movement during the melting or heating phase of the process. Regardless of the reduction in warp direction flexural properties, the improved handleability, reduced fraying from cutting and other advantages of the composite preforms made by the method of the present invention were unchanged.

In accordance with the present invention, the composite preform made by the method of this invention has overcome several prior art disadvantages including the handling problems normally encountered with the plies in fabric laminates or composites. The handling properties of dry fabric preforms or dry fabric layers used for the formation of composite fabric materials have been improved by the incorporation of, and bonding with, a thermoplastic fibrous material in the fabric made substantially of structural fibrous materials which are normally slippery and difficult to handle when layers of the material are stacked adjacent each other. The composite preform made by the method of the present invention can be mechanically held in a dry structural form for cutting and other operations, and fraying and subsequent damage to the yarns and fibers thereby have been reduced or substantially eliminated.

While the present invention has been described in detail with particular reference to certain preferred embodiments and specific examples thereof, it will be understood that variations and modifications can be affected within the spirit and scope of the invention.

What is claimed is:

1. A substantially dry, composite fabric preform comprising:
   a plurality of layers of woven fabric each including reinforcing fibrous yarn defining the fabric form and made of fibers of materials selected from the group consisting of carbon, graphite, glass, boron, silicon, refractories and their combinations;
   the plurality of layers being disposed in a stacked assembly with the layers sequentially adjacent and in contact with each other;

at least each alternating of the layers in the stacked assembly including a thermoplastic fibrous material intermixed with the reinforcing fibrous material and selected from the group consisting of heat softenable polyamide polyacrylic, polyester, polyolefins, derivatives of the foregoing, and mixtures thereof;

the plurality of layers being bonded together by the thermoplastic material at junctures between the fibrous materials.

2. An article of manufacture comprising:

a plurality of layers of woven fabric each including reinforcing fibrous yarn made of fibers of materials selected from the group consisting of carbon, graphite, glass, boron, silicon, refractories and their combinations, the plurality of layers being disposed in a stacked assembly with the layers sequentially adjacent and in contact with each other;

at least each alternating of the layers in the stacked assembly including a thermoplastic fibrous material intermixed with the reinforcing fibrous material and selected from the group consisting of heat softenable polyamide, polyacrylic, polyester, polyolefins, derivatives of the foregoing, and mixtures thereof;

the plurality of layers being bonded together by the thermoplastic material fused at junctures between the fibrous materials; and a resin impregnating the plurality of layers.

* * * * *